(12) United States Patent
Ahn

(10) Patent No.: US 7,859,623 B2
(45) Date of Patent: Dec. 28, 2010

(54) LIQUID CRYSTAL DISPLAY DEVICE AND FABRICATING METHOD THEREOF

(75) Inventor: Byung Gun Ahn, Busan (KR)

(73) Assignee: LG Display Co., Ltd., Seoul (KR)

( * ) Notice: Subject to any disclaimer, the term of this patent is extended or adjusted under 35 U.S.C. 154(b) by 788 days.

(21) Appl. No.: 11/645,378

(22) Filed: Dec. 26, 2006

(65) Prior Publication Data

US 2007/0146585 A1 Jun. 28, 2007

(30) Foreign Application Priority Data

Dec. 27, 2005 (KR) ............ 10-2005-0130748

(51) Int. Cl.
*G02F 1/1335* (2006.01)
(52) U.S. Cl. ............... 349/119; 349/117; 349/118
(58) Field of Classification Search .......... 349/117–119
See application file for complete search history.

(56) References Cited

U.S. PATENT DOCUMENTS

| | | | |
|---|---|---|---|
| 5,148,301 A * | 9/1992 | Sawatsubashi et al. | 349/153 |
| 7,508,474 B2 * | 3/2009 | Kashima | 349/118 |
| 2005/0036089 A1 | 2/2005 | Lyu | |
| 2005/0068479 A1 * | 3/2005 | Moriya | 349/117 |
| 2006/0158599 A1 * | 7/2006 | Koo | 349/155 |

FOREIGN PATENT DOCUMENTS

CN 1499271 5/2004

OTHER PUBLICATIONS

Notification of the First Office Action for corresponding Chinese Patent Application Serial No. 2006101622500, dated Jan. 18, 2008.
Office Action issued in corresponding Chinese Patent Application No. 2006101622500; issued Jul. 4, 2008.

* cited by examiner

*Primary Examiner*—David Nelms
*Assistant Examiner*—Phu Vu
(74) *Attorney, Agent, or Firm*—Brinks Hofer Gilson & Lione

(57) ABSTRACT

A liquid crystal display device comprises a color filter substrate that includes a color filter array and a first substrate. The color filter array is disposed on the first substrate. The liquid crystal display device comprises a thin film transistor substrate that includes a thin film transistor array and a second substrate. The thin film transistor array is disposed on the second substrate. The second substrate is bonded with the first substrate with liquid crystal cells therebetween. The color filter substrate further includes an optical compensation layer that is formed of a reactive mesogen in the color filter array.

4 Claims, 27 Drawing Sheets

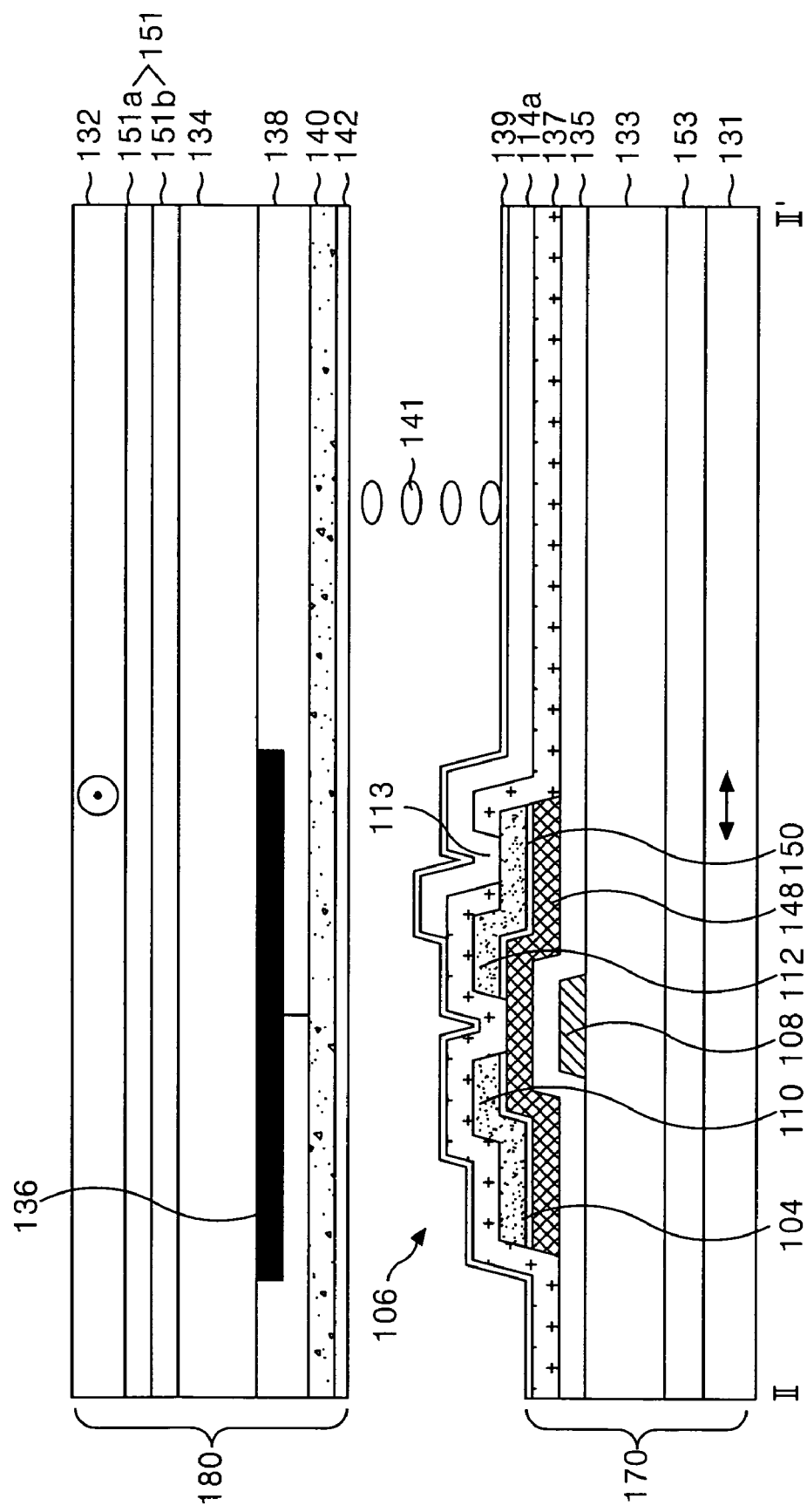

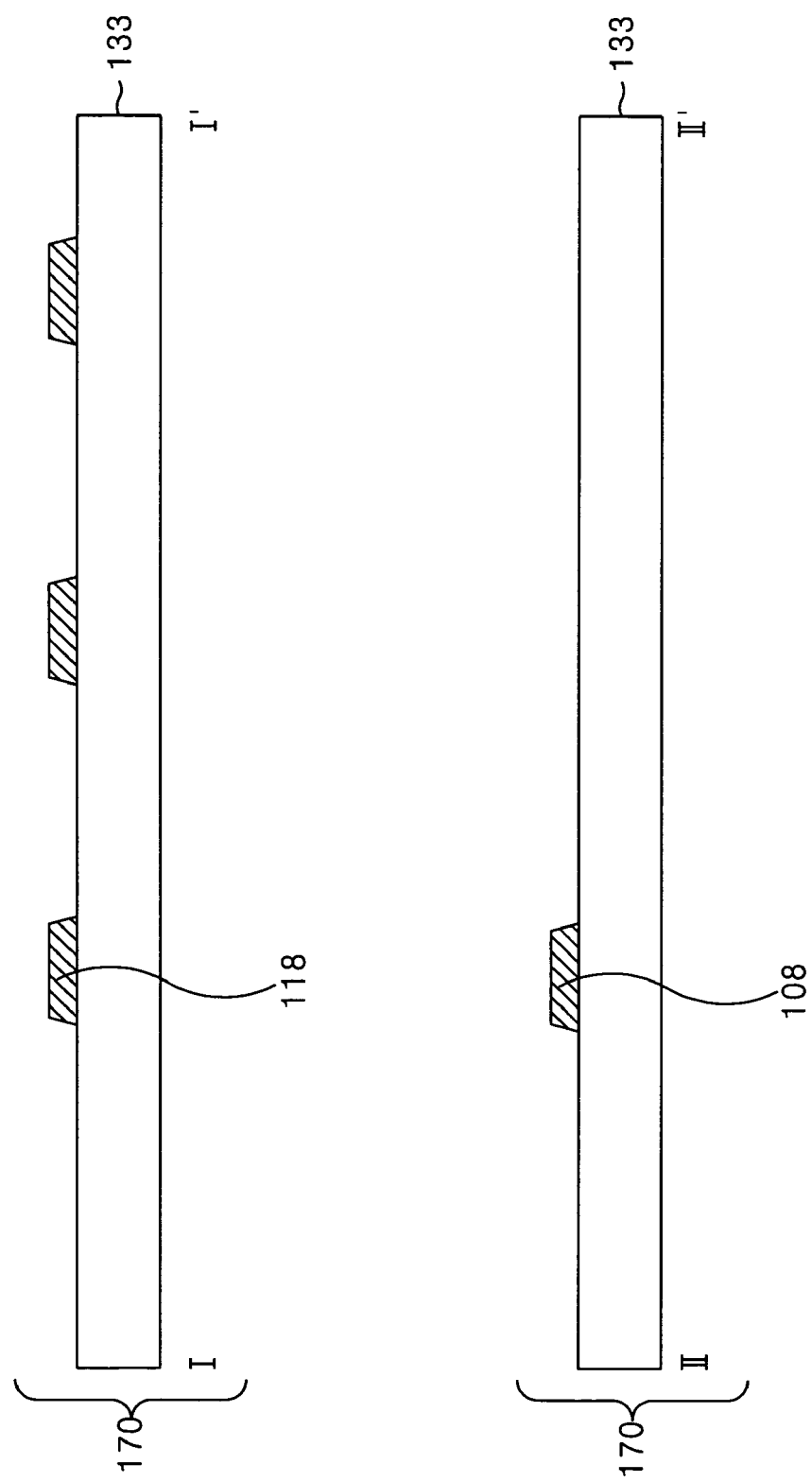

LIQUID CRYSTAL DISPLAY DEVICE AND FABRICATING METHOD THEREOF

This application claims the benefit of the Korean Patent Application No. P05-0130748 filed on Dec. 27, 2005, which is hereby incorporated by reference.

FIELD

The present invention relates to a liquid crystal display device, and more particularly to a liquid crystal display device that is adaptive for reducing a light leakage phenomenon and lowering a cost, and a fabricating method thereof.

BACKGROUND

A liquid crystal display device controls the light transmittance of liquid crystal by use of an electric field, thereby displaying a picture. The liquid crystal display device is generally classified into a vertical electric field applying type and a horizontal electric field applying type in accordance with the direction of the electric field which drives the liquid crystal.

The vertical electric field applying type liquid crystal display device drives a liquid crystal of a VA (vertical alignment) mode by a vertical electric field which is formed between a pixel electrode and a common electrode which are disposed to face each other in upper and lower substrates. The vertical electric field applying type liquid crystal display device has an advantage in that an aperture ratio thereof is high, but on the contrary has a disadvantage in that a viewing angle thereof is narrow to be about 90°.

The horizontal electric field applying type liquid crystal display device drives a liquid crystal of an IPS (in plane switch) mode by a horizontal electric field between a pixel electrode and a common electrode which are disposed to be parallel in a lower substrate. The horizontal electric field applying type liquid crystal display device has an advantage in that a viewing angle thereof is wide to be about 160°. Hereinafter, the horizontal electric field applying type liquid crystal display device will be described in detail.

The horizontal electric field applying type liquid crystal display device includes a thin film transistor substrate (lower substrate) and a color filter substrate (upper substrate) which are bonded to face each other; a spacer for fixedly keeping a cell gap between the two substrates; and a liquid crystal filled in the cell gap.

The thin film transistor substrate includes a plurality of TFT's and a plurality of signal lines for forming a horizontal electric field by the unit of a pixel; and an alignment film spread thereover for aligning the liquid crystal. The color filter substrate includes a color filter for realizing color; a black matrix for preventing light leakage; and an alignment film spread thereover for aligning the liquid crystal.

FIG. 1 is a cross sectional view illustrating a thin film transistor substrate and a color filter substrate of a horizontal electric field applying type liquid crystal display device of the related art.

Referring to FIG. 1, a thin film transistor substrate 70 includes gate lines and data lines 4 which are formed to cross each other on a lower substrate 33; thin film transistors formed at each crossing part thereof; and common electrodes 18 and pixel electrodes 14 for forming a horizontal electric field in a pixel area provided by the crossing structure.

The thin film transistor charges the pixel electrode 14 with a pixel signal of the data line 4 and keeps the charged pixel signal in the pixel electrode 14 in response to a gate signal of the gate line. To this end, the thin film transistor includes a gate electrode connected to the gate line, a source electrode connected to the data line 4 and a drain electrode which forms a channel therebetween together with the source electrode and which is connected to the pixel electrode.

The pixel electrode 14 is connected to the drain electrode of the thin film transistor to be formed in the pixel area.

The common electrode 18 is connected to a common line to be formed in the pixel area.

The gate line and the data line 4 receive a signal from a gate driver and a data driver through a gate pad and a data pad.

The common line receives a common voltage from a common voltage source through a common pad.

Accordingly, a horizontal electric field is formed between the pixel electrode 14 to which the pixel signal is supplied through the thin film transistor and the common electrode 18 to which the common voltage is supplied through the common line.

The color filter substrate 80 includes a black matrix 36 which prevents light leakage and absorbs an external light to increase contrast; a color filter 38 for realizing color; and an overcoat layer 40 for leveling the color filter 38.

Liquid crystal molecules 41 horizontally arranged between an alignment film 39 of the thin film transistor substrate 70 and an alignment film 42 of the color filter substrate 80 are rotated by a dielectric anisotropy caused by the horizontal electric field. Accordingly, the transmittance of the light passing through the pixel area is changed in accordance with the degree of rotation of the liquid crystal molecules 41, thereby realizing a gray level.

A lower polarizer 31 located at the rear surface of the thin film transistor substrate 70 and an upper polarizer 32 located at the rear surface of the color filter substrate 80 are disposed for light transmission axes thereof to be at right angles to each other. In other words, the light passing through the liquid crystal molecules 41 passes through the upper polarizer 32 if the linearly-polarized light is changed by the liquid crystal molecules 41, but the light cannot pass through the upper polarizer 32 if the linearly-polarized light is not changed by the liquid crystal molecules 41.

On the other hand, if black is realized by such a horizontal electric field applying type liquid crystal display device, the light linearly polarized by the lower polarizer 31 is not sufficiently absorbed to the upper polarizer 32, thus there appears a light leakage phenomenon that the amount and color characteristic of the light becomes different in case of observing a location which escapes from the front of the liquid crystal display device, i.e., a side surface thereof, in comparison with observing the front thereof. Especially, as shown in FIG. 2, if the viewing angle is ±70°, the light transmittance is high, thus the light leakage is generated in the greatest scale. This is because the upper and lower polarizers 32, 31 have a structure where a passivation layer having a light absorption axis is deposited with a polarizer having a light transmission axis therebetween, and the passivation layer has a one axis characteristic of having a fixed delay value, thus the polarization direction of the upper polarizer is changed.

The light leakage phenomenon is also generated in the vertical electric field applying type liquid crystal display device that uses the polarizer as well as the horizontal electric field applying type liquid crystal display device shown in FIG. 1.

In order to reduce the light leakage phenomenon, a compensation film such as an A-plate, a positive C-plate, a biaxial film, etc, as shown in FIG. 3, is adhered to the rear surface of the upper and lower substrates 34, 33 together with the upper and lower polarizers 31, 32. The compensation film adhered to the upper substrate 34 uses a structure where a first upper compensation film 51a and a second upper compensation film 51b are deposited, and the compensation film adhered to the lower substrate 33 uses a single layer structure of the lower compensation film 53. At this moment, a separated type film composed of the A-plate and the positive C-plate is used for the upper compensation film 51a, 51b. The light axis of the A-plate has the same horizontal axis as the light transmission axis of the upper polarizer 31, and the light axis of the positive C-plate has the axis which is vertically formed. As shown in FIG. 2, the light leakage phenomenon is greatly reduced by the compensation films.

However, because such a compensation film is additionally required, there is generated a problem in that the cost is increased in comparison with the liquid crystal display device of the related art.

SUMMARY

A liquid crystal display device comprises a color filter substrate that includes a color filter array and a first substrate. The color filter array is disposed on the first substrate. The liquid crystal display device comprises a thin film transistor substrate that includes a thin film transistor array and a second substrate. The thin film transistor array is disposed on the second substrate. The second substrate is bonded with the first substrate with liquid crystal cells therebetween. The color filter substrate further includes an optical compensation layer that is formed of a reactive mesogen in the color filter array.

A fabricating method of a liquid crystal display device comprises providing a first substrate and a second substrate that are bonded together with liquid crystal cells therebetween, forming a color filter substrate inclusive of a color filter array on the first substrate, and forming a thin film transistor substrate inclusive of a thin film transistor array on the second substrate. Forming the color filter substrate further includes the step of forming an optical compensation layer of a reactive mesogen in the color filter array.

BRIEF DESCRIPTION OF THE DRAWINGS

These and other objects of the invention will be apparent from the following detailed description of the embodiments of the present invention with reference to the accompanying drawings, in which:

FIGS. 5A and 5B are cross sectional views illustrating a thin film transistor substrate and a color filter substrate taken along the lines I-I' and II-II';

FIGS. 7A to 7E are cross sectional views illustrating a fabricating method of the thin film transistor substrate;

DETAILED DESCRIPTION

Reference will now be made in detail to the preferred embodiments of the present invention, examples of which are illustrated in the accompanying drawings.

With reference to FIGS. 4 to 11E, embodiments of the present invention will be explained as follows.

Figure 1:
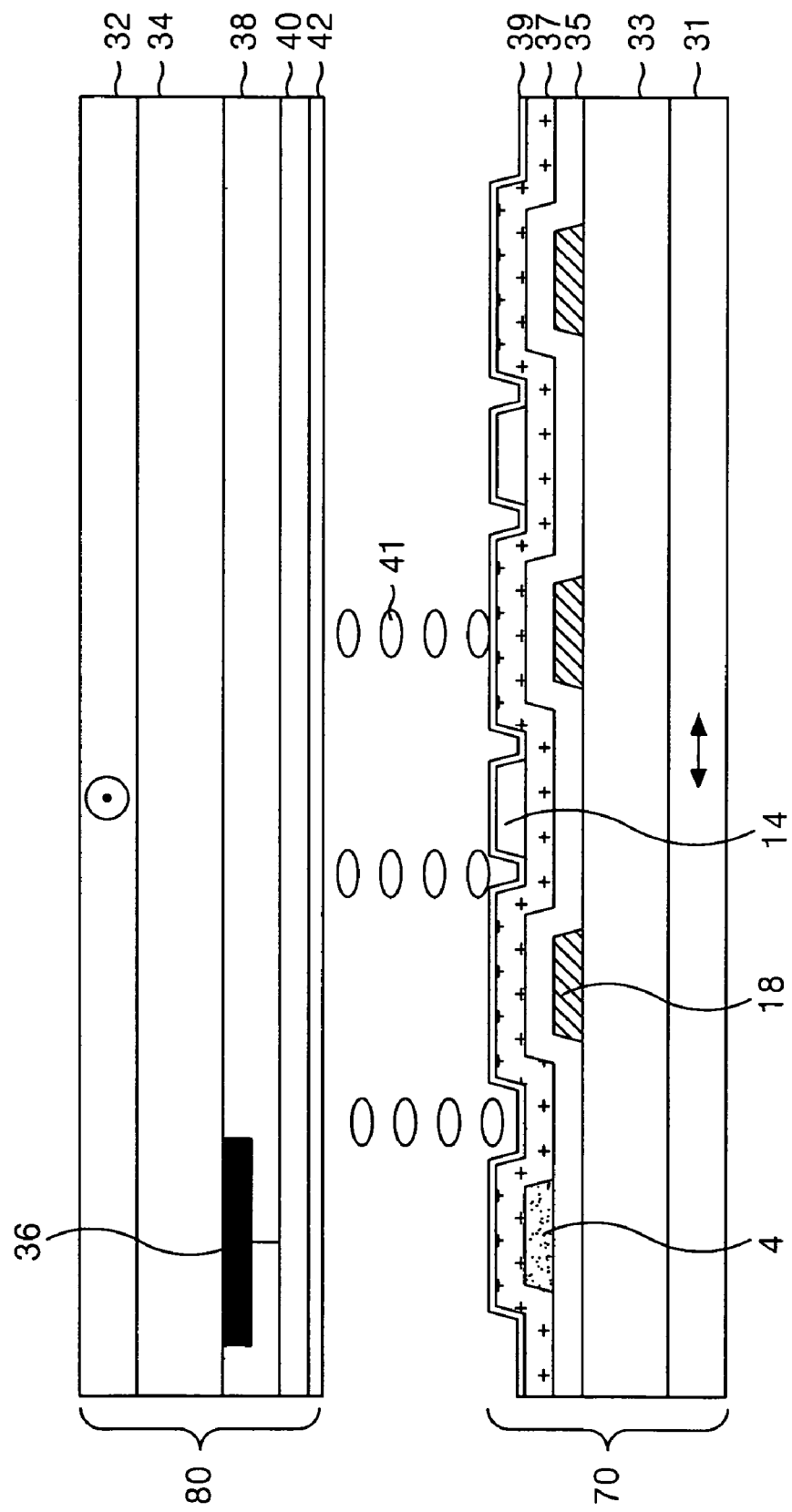
FIG. 1 is a cross sectional view illustrating a thin film transistor substrate and a color filter substrate of a horizontal electric field applying type liquid crystal display device of the related art.
Figure 2:
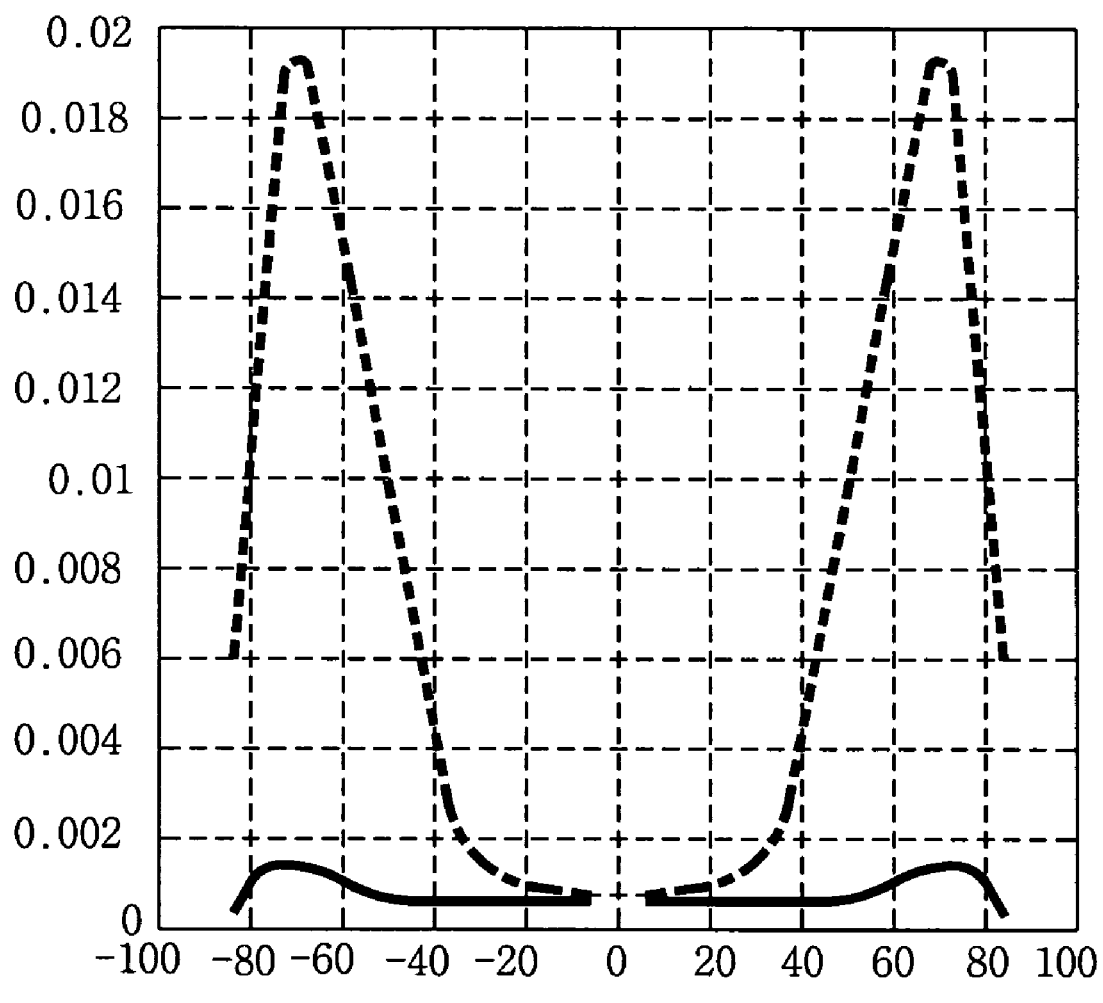
FIG. 2 illustrates a light leakage phenomenon of the related art.
Figure 3:
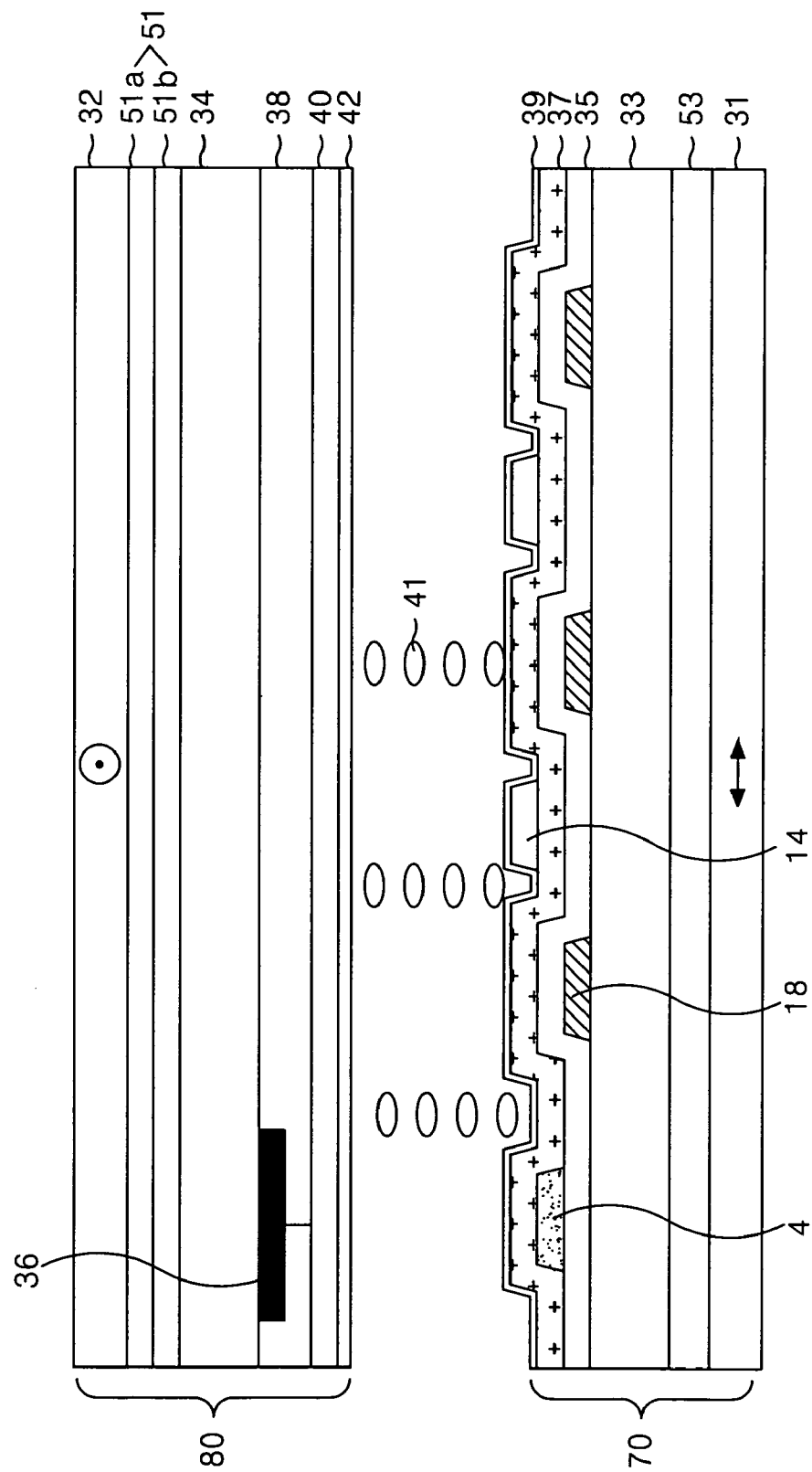
FIG. 3 illustrates that a compensation film is adhered to the liquid crystal display device of FIG. 1.
Figure 4:
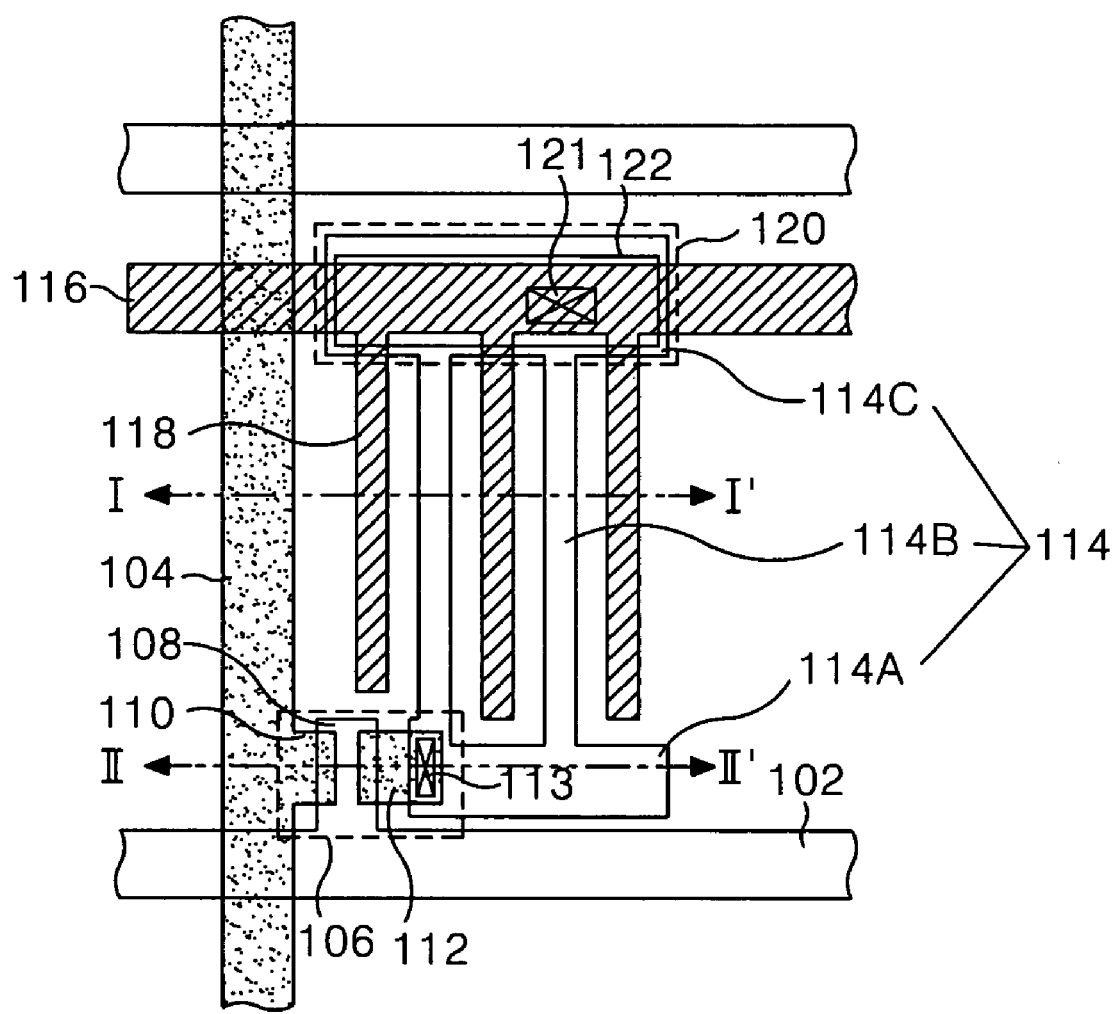
FIG. 4 is a plan view illustrating a horizontal electric field applying type liquid crystal display device according to an embodiment of the present invention.
Figure 5A:
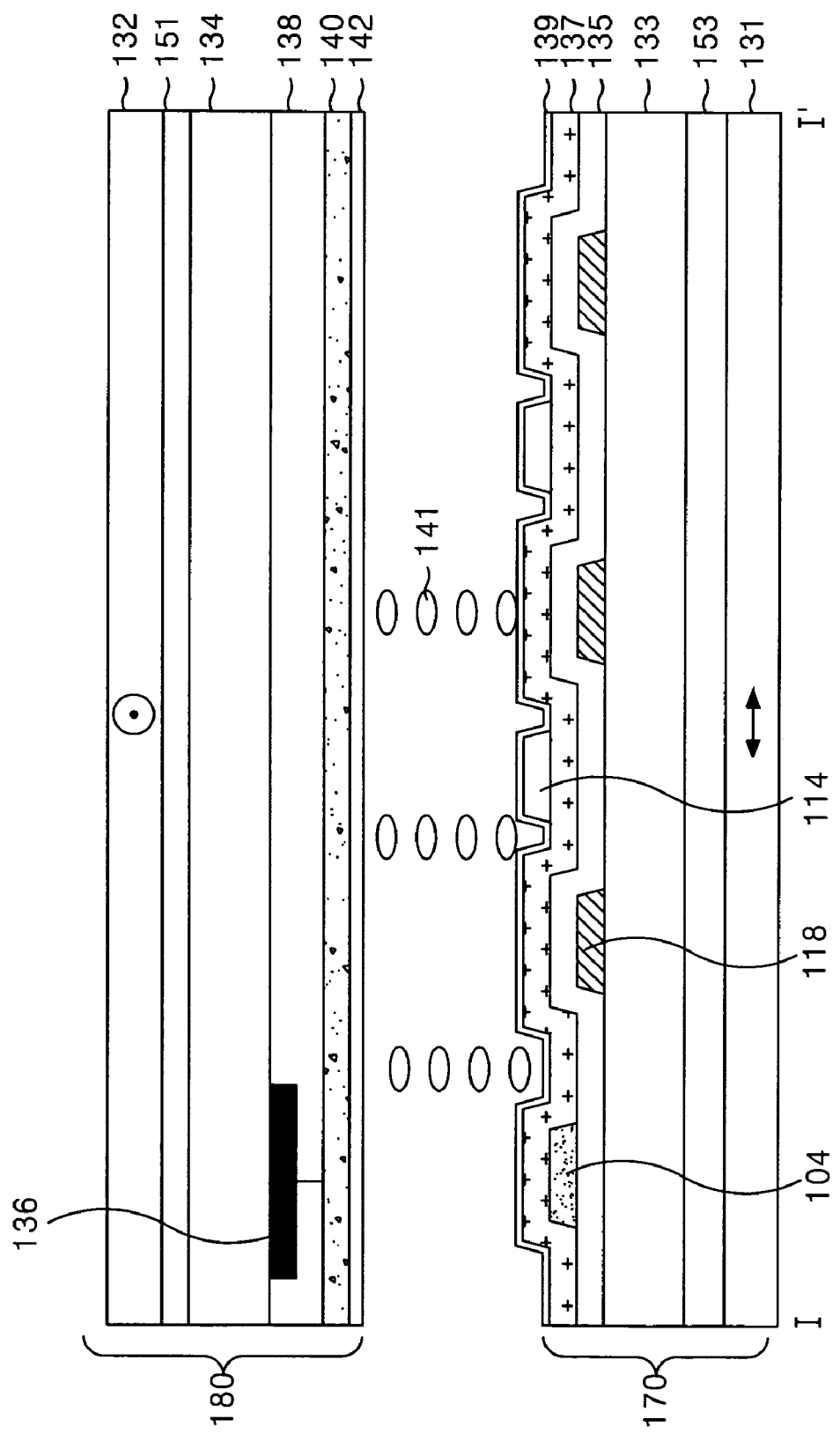

FIG. 4 is a plan view illustrating a horizontal electric field applying type liquid crystal display device according to an embodiment of the present invention using four mask processes, and FIGS. 5A and 5B are cross sectional views illustrating a thin film transistor substrate and a color filter substrate taken along the lines I-I', II-II' of FIG. 4.

Referring to FIG. 4 to 5B, a thin film transistor substrate 170 includes a gate line 102 and a data line 104 formed to cross each other with a gate insulating film 135 therebetween on a lower substrate 133. A lower polarizer 131 and a lower compensation film 153 are formed on the lower substrate 133. A thin film transistor 106 is formed at each of the crossing parts. A common electrode 118 and a pixel electrodes are disposed to form a horizontal electric field at a pixel area provided by the crossing structure. A common line 116 is connected to the common electrode 118. The thin film transistor substrate 170 further includes a storage capacitor 120 formed at an overlapping part of the pixel electrode 114 and the common line 116.

The gate line 102 supplying a gate signal and the data line 104 supplying a data signal are formed in a crossing structure to define the pixel area.

The common line 116 supplying a reference voltage for driving liquid crystal is formed parallel to the gate line 102 with the pixel area therebetween.

The thin film transistor 106 has the pixel signal of the data line 104 charged and kept in the pixel electrode 114 in response to the gate signal of the gate line 102. The thin film transistor 106 includes a gate electrode 108 connected to the gate line 102, a source electrode 110 connected to the data line 104, and a drain electrode 110 which forms a channel therebetween together with the source electrode 110 and is connected to the pixel electrode. The thin film transistor 106 further includes an active layer 148 which overlaps the gate electrode 108 with a gate insulating film 135 therebetween to form a channel between the source electrode 110 and the drain electrode 112, and an ohmic contact layer 150. The active layer 148 is in ohmic contact with the source electrode 110 and the drain electrode 112.

The pixel electrode 114 is connected to the drain electrode 112 of the thin film transistor 106 through a pixel contact hole 113 that penetrates a passivation film 137, thereby being formed in the pixel area. The pixel electrode 114 includes a first horizontal part 114A which is connected to the drain electrode 112 and in parallel to the adjacent gate line 102, a second horizontal part 114C overlapping the common line 116, and a finger part 114B formed in parallel between the first and second horizontal parts 114A, 114C.

The common electrode 118 is connected to the common line 116 formed in the pixel area. The common electrode 118 is formed parallel to the finger part 114B of the pixel electrode 114 in the pixel area.

The storage capacitor 120 includes the common line 116 and a storage electrode 122 which is connected to the pixel electrode 114 through a storage contact hole 121. The storage capacitor 120 keeps the pixel signal stable, which is charged in the pixel electrode 114, until the next pixel signal is charged therein.

The gate line 102 and the data line 104 receive signals from a gate driver and a data driver through a gate pad and a data pad, respectively.

The common line 116 receives a common voltage from a common voltage source through a common pad.

Accordingly, a horizontal electric field is formed between a pixel electrode 114 to which the pixel signal is supplied through the thin film transistor 106 and the common electrode 118 to which the common voltage is supplied through the common line 116. Preferably, a horizontal electric field is formed between the common electrode 118 and the finger part 114C of the pixel electrode 114.

The color filter substrate 180 includes a black matrix 136 which prevents a light leakage on an upper substrate 134 where an upper polarizer 132 and an upper compensation film 151 are formed and absorbs an external light to increase contrast. The color filter substrate 180 further includes a color filter 138 for realizing color and a compensation layer 140 which levels the color filter 138 and acts as a compensation film.

An A-plate is used as the upper compensation film 151, and a reactive mesogen (RM) material having a retardation characteristic, i.e., a fixed delay value, is used as the compensation layer 140. Thus it is possible to have the same effect as a C-plate of the related art. The compensation films are reduced by one in the compensation layer 140 in comparison with the related art, thereby making it possible to reduce a cost and to solve the light leakage phenomenon.

The compensation layer 140 can also be formed between the upper polarizer 132 and the upper compensation film 151, between the upper compensation film 151 and the upper substrate 134 or between the upper substrate 134 and the color filter 138 besides the location shown in the drawing. And, at this moment, an overcoat layer is formed on the color filter 138.

Liquid crystal molecules 141 horizontally arranged between an alignment film 139 of the thin film transistor substrate 170 and an alignment film 142 of the color filter substrate 180 are rotated by a dielectric anisotropy caused by the horizontal electric field. And, the transmittance of the light which passes through the pixel area in accordance with the rotation degree of the liquid crystal molecules 141, thereby realizing a gray level.

A lower polarizer 131 located at the rear of the thin film transistor substrate 170 and an upper polarizer 132 located at the rear of the color filter substrate 180 are disposed such that their light transmission axes cross each other. In other words, the light passing through the liquid crystal molecules 141 passes through the upper polarizer 132 if the linearly-polarized light is changed by the liquid crystal molecules 141, but does not pass through the upper polarizer 132 if the linearly-polarized light is not changed by the liquid crystal molecules 141. The upper and lower polarizers 132, 131 are adhered together with the upper and lower compensation films 151, 153, respectively, after the thin film transistor substrate 170 and the color filter substrate 180 are bonded together.

A fabricating method of a liquid crystal display device according to the embodiment of the present invention will be explained in reference to FIGS. 6A to 11E.

FIGS. 6A to 6D are views where the upper part and the lower part of the color filter substrate 180 shown in FIG. 5A are inverted in order to explain a fabrication process of the color filter substrate 180.

The color filter substrate 180 shown in FIG. 5B is the same as the color filter substrate 180 shown in FIG. 5A, thus it will be explained in reference to FIG. 5A because their deposition sequences are the same.

Figure 6A:
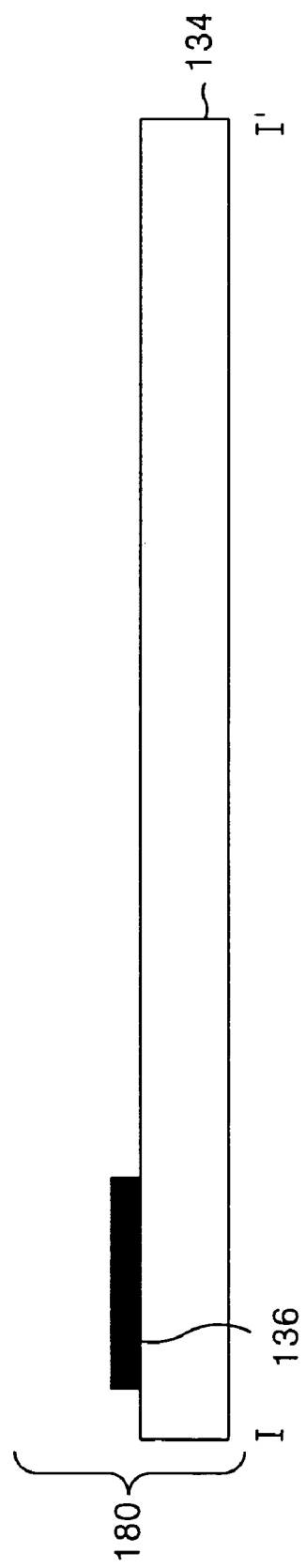
FIGS. 6A to 6D are cross sectional views illustrating a fabricating method of the color filter substrate.

Firstly, referring to FIG. 6A, an opaque material is deposited in the upper substrate 134, and then the opaque material is patterned by a photolithography process using a mask and an etching process, thereby forming a black matrix 136.

A photosensitive red resin is deposited on the entire surface of the upper substrate 134 where the black matrix 136 is formed. A mask having an exposure area and a shielding area is aligned onto the upper substrate 134 where the red resin is deposited. Subsequently, the red resin exposed through the exposure area is removed by the photolithography process using a mask and the etching process, and the red resin which is not exposed through the shielding area remains, thereby forming a red color filter.

A green resin is deposited on the entire surface of the upper substrate 134 where the red color filter is formed. A green color filter is formed by repeating the same mask process as the red color filter forming process.

Figure 6B:
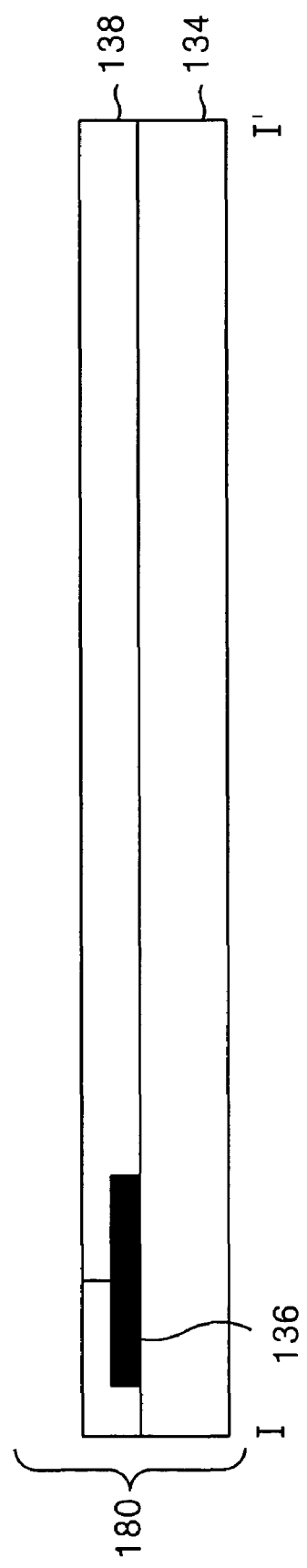

A blue resin is deposited on the entire surface of the upper substrate 134 where the green color filter is formed. A green color filter is formed by repeating the same mask process as the red and green color filter forming process A color filter 138 is formed by such processes, as shown in FIG. 6B.

Figure 6C:
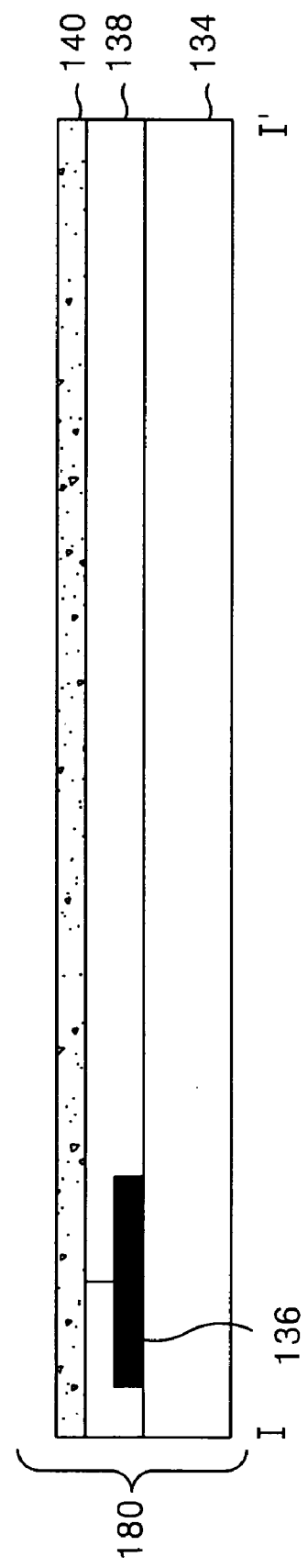

The RM material is spread by a method such as a spin coating, etc on the upper substrate 134 where the color filter 138 is formed, thereby forming a compensation layer 140, as shown in FIG. 6C.

Figure 6D:
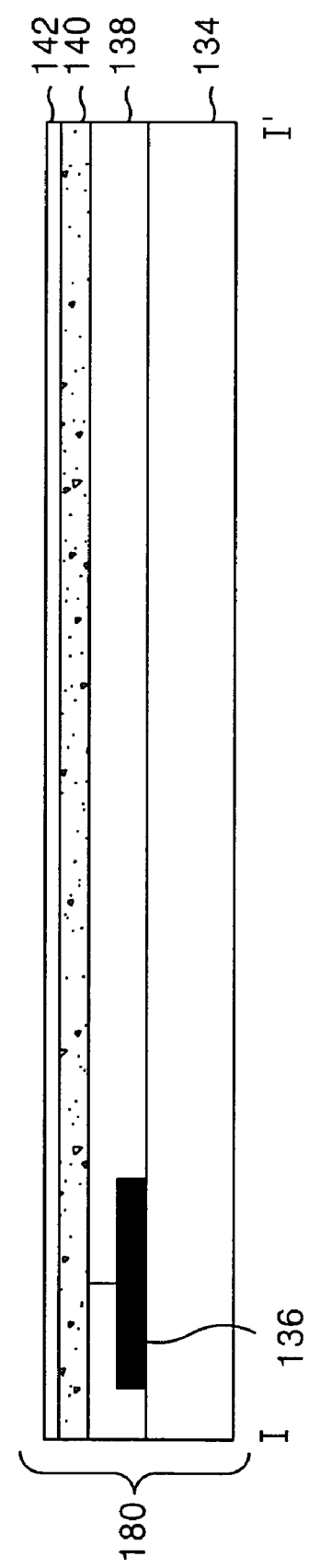

An alignment material such as polyimide PI, etc is spread over the upper substrate 134 where the compensation layer 140 is formed and a rubbing process is carried out, thereby forming an alignment film 142, as shown in FIG. 6D.

FIGS. 7A to 7E are views illustrating a fabrication process of the thin film transistor substrate 170 shown in FIGS. 5A and 5B.

The fabricating method of the thin film transistor substrate 170 using four mask processes will be explained in reference to FIG. 4 and FIGS. 7A to 7E.

The liquid crystal display device is not relevant to the number of masks even though it is explained by four mask processes in these drawings.

First, a gate metal pattern inclusive of the gate line 102, the gate electrode 108 and the common electrode 118 is formed on the lower substrate 133 by use of a first mask process, as shown in FIG. 7A.

To describe in detail, the gate metal layer is formed on the lower substrate 133 by a deposition method such as sputtering, etc. Subsequently, the gate metal layer is patterned by a photolithography process using a first mask and an etching process, thereby forming the gate metal pattern inclusive of the gate line 102, the gate electrode 108 and the common electrode 118. The gate metal layer is formed in a single layer or double layer structure of metals such as Al, Mo, Cr group, etc.

Figure 7B:
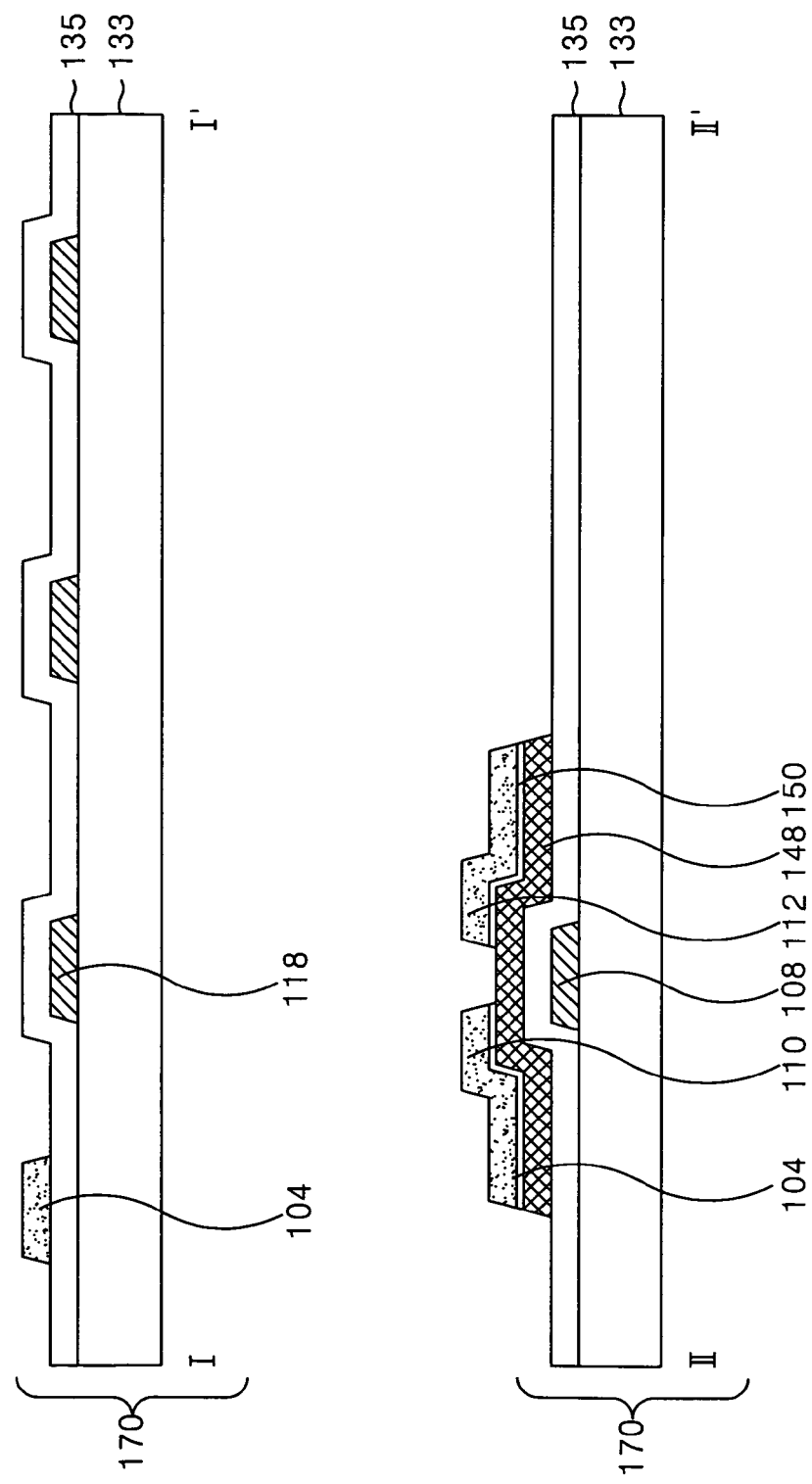

The gate insulating film 135 is spread over the lower substrate 133 where the gate metal pattern is formed, as shown in FIG. 7B. And, a semiconductor pattern inclusive of an active layer 148 and an ohmic contact layer 150, and a source/drain metal pattern inclusive of the data line 104, the source electrode 110, the drain electrode 112 are formed on the gate insulating film 135 by use of a second mask process.

To describe in detail, the gate insulating film 135, an amorphous silicon layer, an n+ amorphous silicon layer, and the source/drain metal layer are sequentially formed by a deposition method such as PECVD, sputtering, etc on the lower substrate 133 where the gate metal pattern is formed. Herein, an inorganic insulating material such as $SiO_x$, $SiN_x$, etc is used as the material of the gate insulating film 135. The source/drain metal layer is formed in a single layer or double layer structure of metals such as Al, Mo, Cr group, etc. Subsequently, a photo-resist pattern having a stepped difference is formed on the source/drain metal layer by the photolithography process using a second mask. The source/drain metal layer is patterned by a wet etching process using the photo-resist pattern having the stepped difference, thereby forming the source/drain metal pattern inclusive of the data line 104, the source electrode 110 and the drain electrode 112 integrated with the source electrode 110. The n+ amorphous silicon layer and the amorphous silicon layer are simultaneously patterned by a dry etching process using the same photo-resist pattern, thereby forming the ohmic contact layer 150 and the active layer 148. Subsequently, the photo-resist pattern is ashed and the exposed source/drain metal pattern is etched together with the ohmic contact layer 150, thus the source electrode 110 and the drain electrode 112 are separated and the photo-resist pattern remaining on the source/drain metal pattern is removed by a stripping process.

Figure 7C:
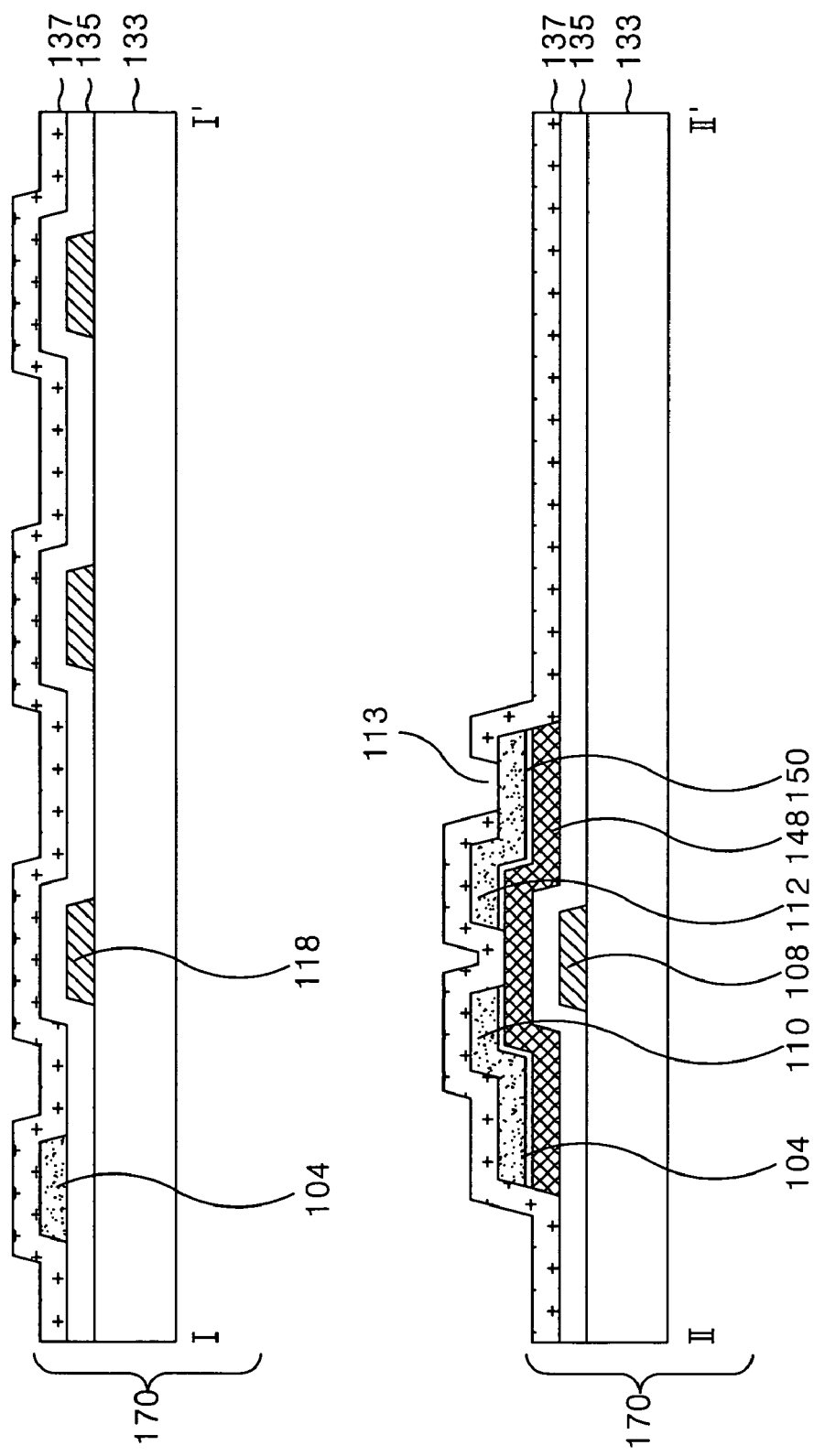

A passivation film 137 inclusive of the pixel contact hole 113 and the storage contact hole 121 is formed on the gate insulating film 135 where the source/drain metal pattern is formed by use of a third mask process, as shown in FIG. 7C.

To describe in detail, the passivation film 137 is formed on the entire surface of the gate insulating film where the source/drain metal pattern is formed by a deposition method such as PECVD, etc. Subsequently, the passivation film 137 is patterned by a photolithography process using a third mask and an etching process, thereby forming a pixel contact hole 113 and a storage contact hole 121 (shown in FIG. 4). The pixel contact hole 113 penetrates the passivation film 137 to expose the drain electrode 112, and the storage contact hole 121 penetrates the passivation film 137 to expose the storage electrode 122.

Herein, an inorganic insulating material such as the gate insulating film 135 or an organic insulating material such as BCB, PFCB or acrylic group organic compound, of which the dielectric constant is low, is used as a material of the passivation film 137.

Figure 7D:
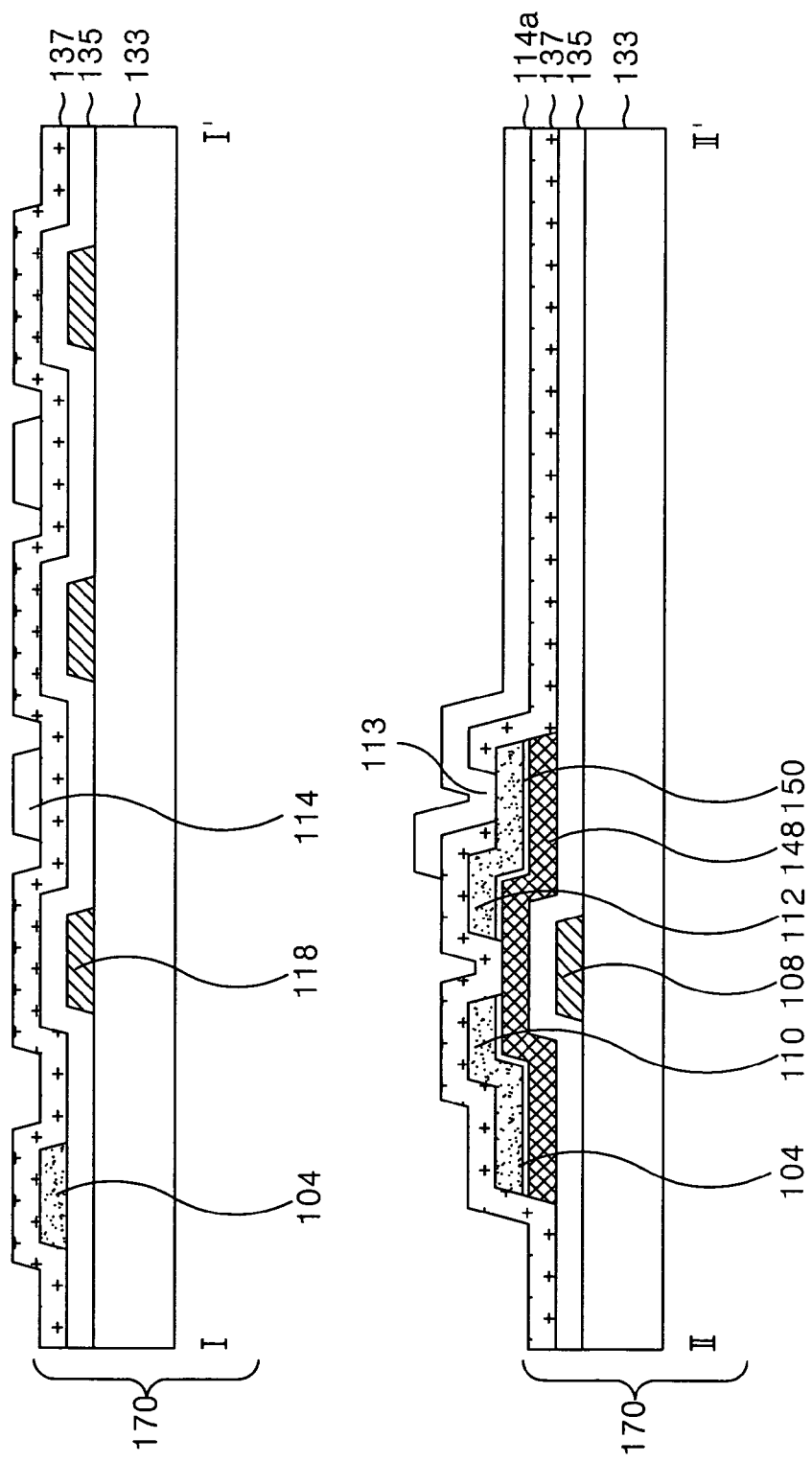

A transparent conductive pattern inclusive of the pixel electrode 114 is formed on the passivation film 137, as shown in FIG. 7D.

To describe in detail, the transparent conductive film is spread over the passivation film 137 by a deposition method such as sputtering, etc. Subsequently, the transparent conductive film is patterned by a photolithography process using a fourth mask and an etching process, thereby forming the transparent conductive pattern inclusive of the pixel electrode 114. The pixel electrode 114 is connected to the drain electrode 112 which is exposed through the pixel contact hole 113, and connected to the storage electrode 122 which is exposed through the storage contact hole 121.

Herein, ITO (indium tin oxide), etc is used as a material of the transparent conductive film.

Figure 7E:
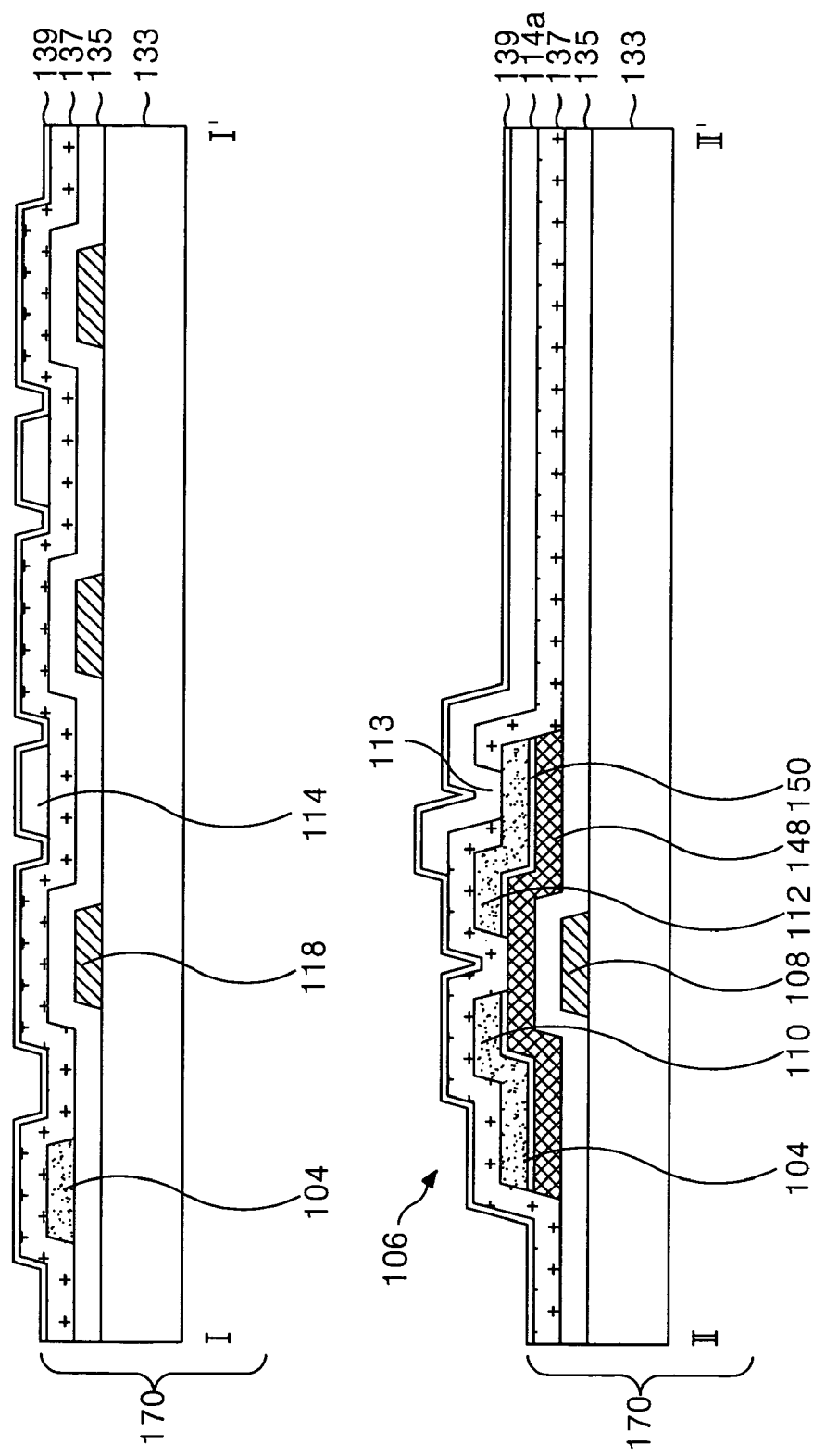

An alignment material such as polyimide PI, etc is spread over the lower substrate 133 where the pixel electrode 113 is formed and a rubbing process is carried out, thereby forming an alignment film 139, as in FIG. 7E.

The color filter substrate 180 and the thin film transistor substrate 170 which are formed through such processes are bonded together, and then, the upper and lower polarizers 131, 132 inclusive of the upper and lower compensation films 151, 153 are adhered, as shown in FIGS. 5A and 5B.

Figure 8:
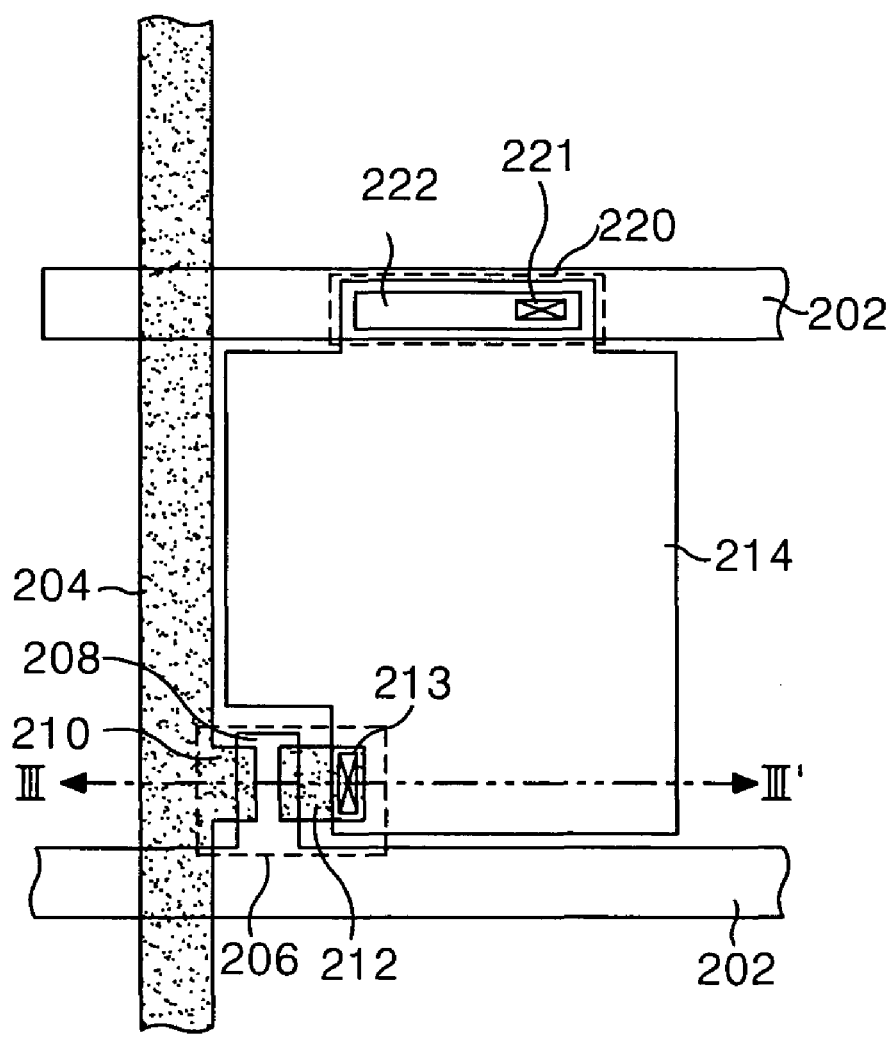
FIG. 8 is a plan view illustrating a thin film transistor substrate of a vertical electric field applying type liquid crystal display device according to another embodiment of the present invention.
Figure 9:
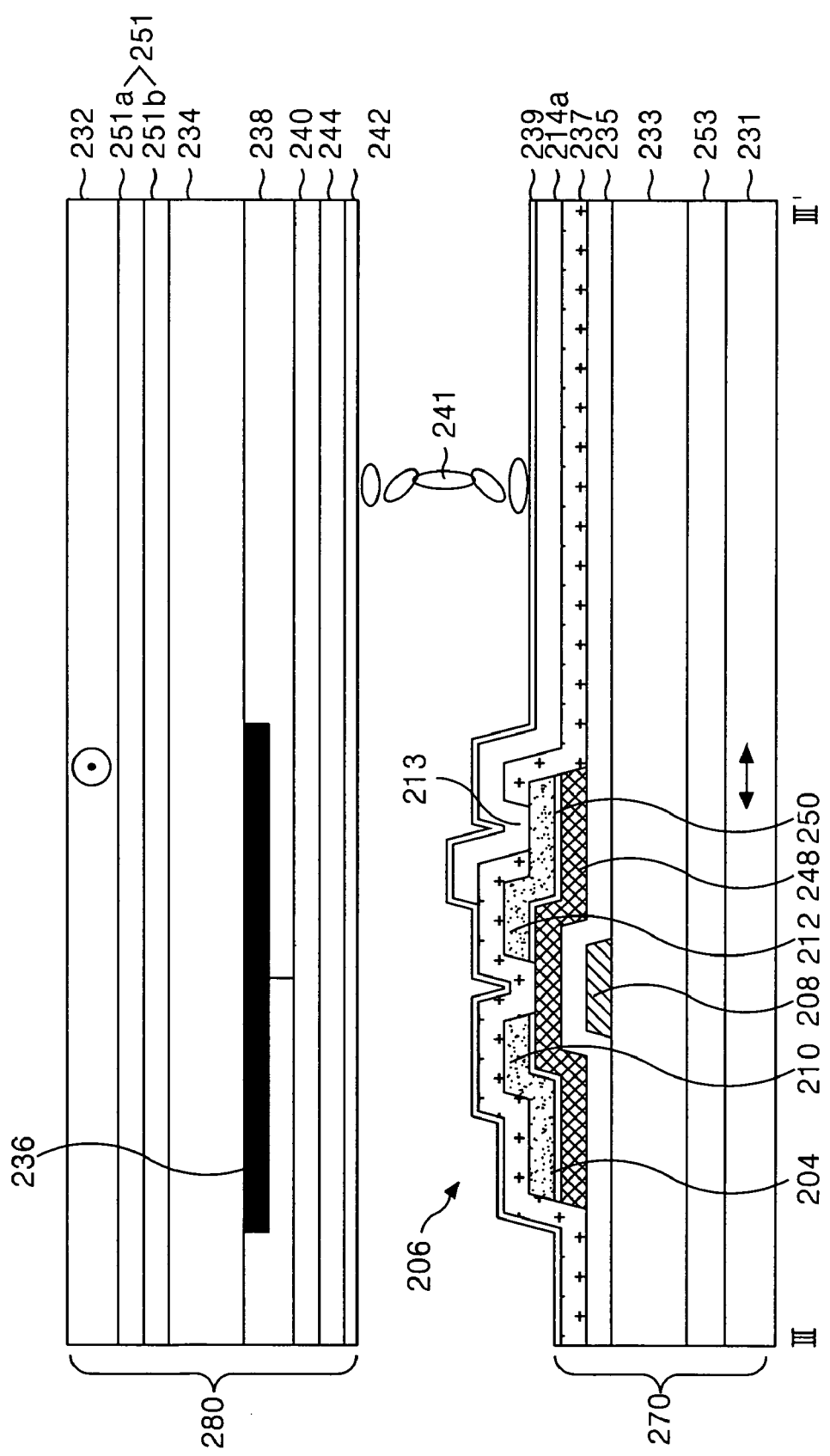
FIG. 9 is a cross sectional view illustrating a thin film transistor substrate and a color filter substrate taken along the line III-III' of FIG. 8.

FIG. 8 is a plan view illustrating a thin film transistor substrate of a vertical electric field applying type liquid crystal display device according to another embodiment of the present invention using four mask processes, and FIG. 9 is a cross sectional view illustrating the thin film transistor substrate taken along the line III-III' of FIG. 8.

Referring to FIG. 8 to 9, a thin film transistor substrate 270 includes gate lines 202 and data lines 204 formed to cross each other with a gate insulating film 235 therebetween on a lower substrate 233. A lower polarizer 231 and a lower compensation film 253 are formed on a lower substrate 233. A thin film transistor 206 is formed at each of the crossing parts. A pixel electrode 214 is formed at a pixel area provided by the crossing structure. A storage capacitor 220 is formed at the overlapping part of the gate line 202 and a storage electrode 222.

The gate lines 202 supplying gate signals and the data lines 204 supplying data signals are formed in a crossing structure to define the pixel area.

The thin film transistor 206 has the pixel signal of the data line 204 charged and kept in the pixel electrode 214 in response to the gate signal of the gate line 202. To this end, the thin film transistor 206 includes a gate electrode 208 connected to the gate line 202, a source electrode 210 connected to the data line 204, and a drain electrode 210 connected to the pixel electrode 214. Also, the thin film transistor 206 includes an active layer 248 which overlaps the gate electrode 208 with a gate insulating film 235 therebetween to form a channel between the source electrode 210 and the drain electrode 212. The thin film transistor 206 further includes an ohmic contact layer 250. The active layer 248 is in ohmic contact with the source electrode 210 and the drain electrode 212.

The pixel electrode 214 is connected to the drain electrode 212 of the thin film transistor 206 through a pixel contact hole 213 that penetrates a passivation film 237, thereby being formed in the pixel area.

The storage capacitor 220 includes the gate line 202 and a storage electrode 222 which is connected to the pixel electrode 214 through a storage contact hole 221. The storage capacitor 220 keeps the pixel signal stable, which is charged in the pixel electrode 214, until the next pixel signal is charged therein.

The gate line 202 and the data line 204 receive signals from a gate driver and a data driver through a gate pad and a data pad, respectively.

The color filter substrate 280 includes a black matrix 236 which prevents a light leakage on an upper substrate 234 where an upper polarizer 232 and an upper compensation film 251 are formed and absorbs an external light to increase contrast. The color filter substrate 280 further includes a color filter 238 for realizing color, a compensation layer 240 formed on the color filter 238 to act as a compensation film, and a common electrode 244 formed on the compensation layer 240 to supply a reference voltage.

An A-plate is used as the upper compensation film 251, and a reactive mesogen (RM) material having a retardation characteristic, i.e., a fixed delay value, is used as the compensation layer 240, thus it is possible to have the same effect as a C-plate of the related art. The compensation films are reduced by one in the compensation layer 240 in comparison with the related art, thereby making it possible to reduce a cost and to solve the light leakage phenomenon.

The compensation layer 240 can also be formed between the upper polarizer 232 and the upper compensation film 251, between the upper compensation film 251 and the upper substrate 234 or between the upper substrate 234 and the color filter 238 besides the location shown in the drawing.

A vertical electric field is formed between the pixel electrode to which the pixel signal is supplied through the thin film transistor 206 and the common electrode 244 to which a reference voltage is supplied.

By such an electric field, liquid crystal molecules 241 between an alignment film 239 of the thin film transistor substrate 270 and an alignment film 242 of the color filter substrate 280 are rotated by a dielectric anisotropy. And, the transmittance of the light which passes through the pixel area in accordance with the rotation degree of the liquid crystal molecules 241, thereby realizing a gray level.

A lower polarizer 231 located at the rear of the thin film transistor substrate 270 and an upper polarizer 232 located at the rear of the color filter substrate 280 are disposed such that their light transmission axes cross each other. In other words, the light passing through the liquid crystal molecules 241 passes through the upper polarizer 232 if the linearly-polarized light is changed by the liquid crystal molecules 241, but does not pass through the upper polarizer 232 if the linearly-polarized light is not changed by the liquid crystal molecules 241.

A fabricating method of a liquid crystal display device according to the embodiment of the present invention will be explained in reference to FIGS. 10A to 11E.

FIGS. 10A to 10E are views where the upper part and the lower part of the color filter substrate 280 shown in FIG. 9 are inverted in order to explain a fabrication process of the color filter substrate 280.

Figure 10A:
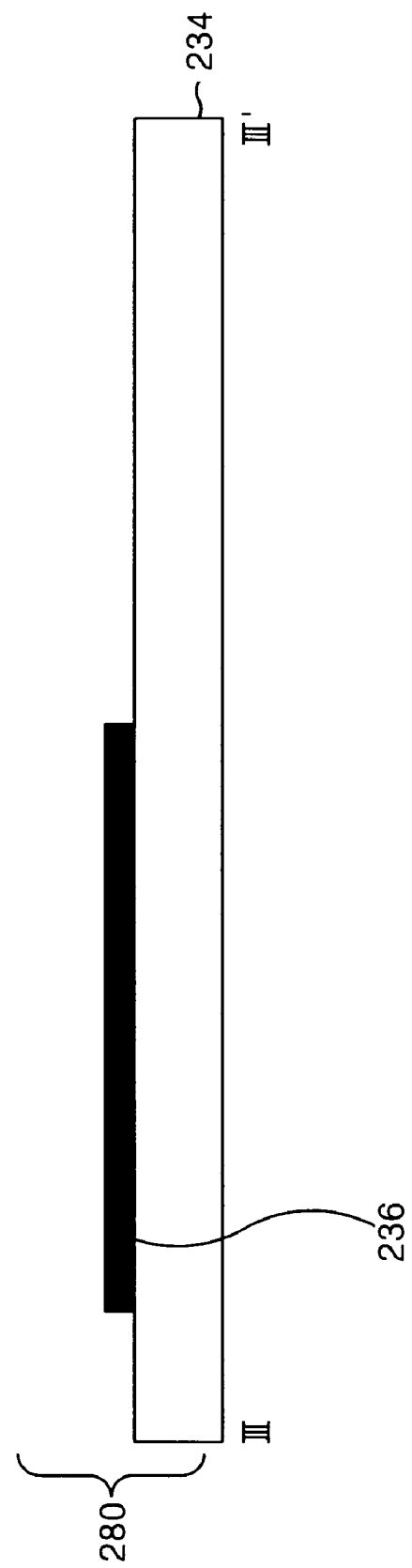
FIGS. 10A to 10E are cross sectional views illustrating a fabricating method of the color filter substrate.

First, referring to FIG. 10A, an opaque material is deposited in the upper substrate 234, and then the opaque material is patterned by a photolithography process using a mask and an etching process, thereby forming a black matrix 236.

A photosensitive red resin is deposited on the entire surface of the upper substrate 234 where the black matrix 236 is formed. A mask having an exposure area and a shielding area is aligned onto the upper substrate 234 where the red resin is deposited. Subsequently, the red resin exposed through the exposure area is removed by the photolithography process using a mask and the etching process, and the red resin which is not exposed through the shielding area remains, thereby forming a red color filter.

A green resin is deposited on the entire surface of the upper substrate 234 where the red color filter is formed. A green color filter is formed by repeating the same mask process as the red color filter forming process.

Figure 10B:
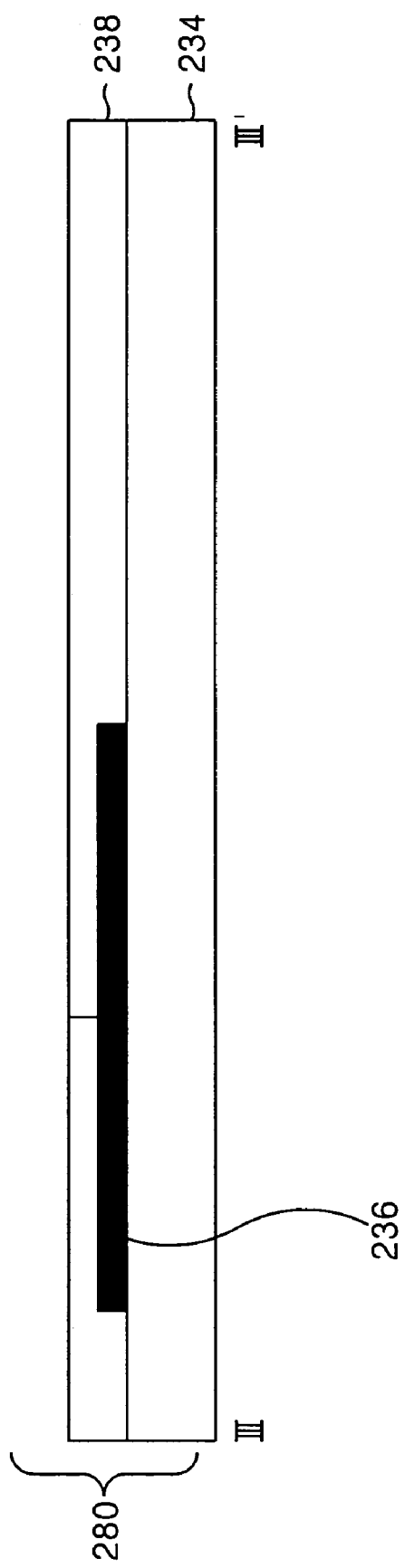

A blue resin is deposited on the entire surface of the upper substrate 134 where the green color filter is formed. A green color filter is formed by repeating the same mask process as the red and green color filter forming process A color filter 238 is formed by such processes, as shown in FIG. 10B.

Figure 10C:

The RM material is spread by a method such as a spin coating, etc on the upper substrate 234 where the color filter 238 is formed, thereby forming a compensation layer 240, as shown in FIG. 10C.

Figure 10D:

A transparent conductive layer 244 is formed by a deposition method such as sputtering, etc on the upper substrate 234 where the compensation layer 240 is formed, as shown in FIG. 10D. ITO (indium tin oxide), etc is used as a material of the transparent conductive layer 244.

Figure 10E:

An alignment material such as polyimide PI, etc is spread over the upper substrate 234 where the transparent conductive layer 244 is formed and a rubbing process is carried out, thereby forming an alignment film 242, as shown in FIG. 10E.

The fabricating method of the thin film transistor substrate 270 using four mask processes will be explained in reference to FIG. 9 and FIGS. 11A to 11E.

The liquid crystal display device is not relevant to the number of masks even though it is explained by four mask processes in these drawings.

Figure 11A:
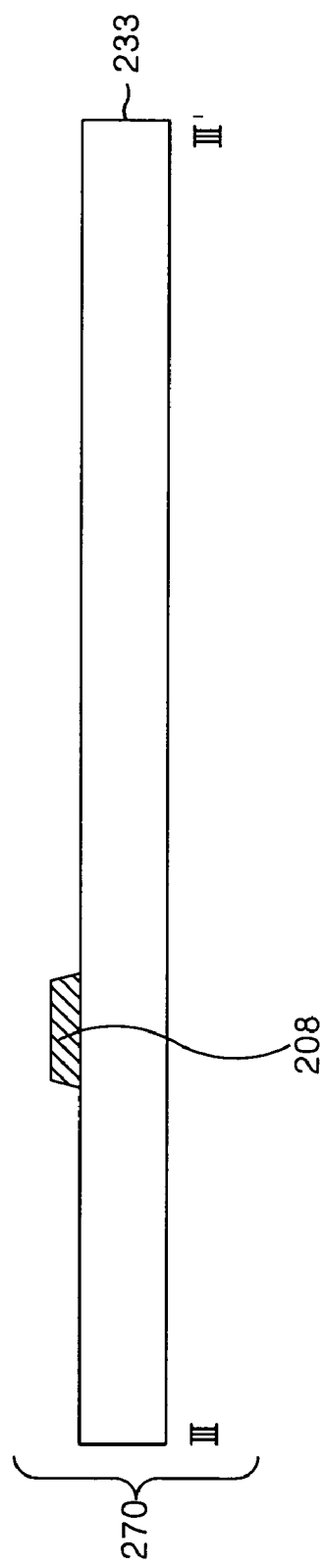
FIGS. 11A to 11E are cross sectional views illustrating a fabricating method of the thin film transistor substrate.

First, a gate metal pattern inclusive of the gate line 202 and the gate electrode 208 is formed on the lower substrate 233 by use of a first mask process, as shown in FIG. 11A.

To describe in detail, the gate metal layer is formed on the lower substrate 233 by a deposition method such as sputtering, etc. Subsequently, the gate metal layer is patterned by the photolithography process using a first mask and an etching process, thereby forming the gate metal pattern inclusive of the gate line 202 and the gate electrode 208. The gate metal layer is formed in a single layer or double layer structure of metals such as Al, Mo, Cr group, etc.

Figure 11B:
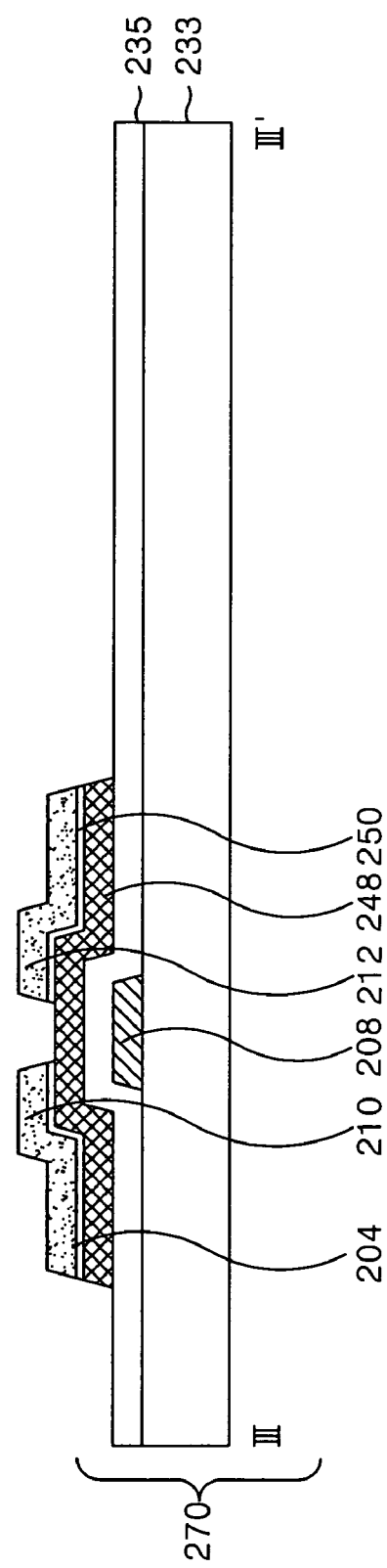

The gate insulating film 235 is spread over the lower substrate 233 where the gate metal pattern is formed, as shown in FIG. 11B. And, a semiconductor pattern inclusive of an active layer 248 and an ohmic contact layer 250, and a source/drain metal pattern inclusive of the data line 204, the source electrode 210, the drain electrode 212 and the storage electrode 222 are formed on the gate insulating film 235 by use of a second mask process.

To describe in detail, the gate insulating film 235, an amorphous silicon layer, an n+ amorphous silicon layer, and the source/drain metal layer are sequentially formed by a deposition method such as PECVD, sputtering, etc on the lower substrate 233 where the gate metal pattern is formed. Herein, an inorganic insulating material such as $SiO_x$, $SiN_x$, etc is used as the material of the gate insulating film 235. The source/drain metal layer is formed in a single layer or double layer structure of metals such as Al, Mo, Cr group, etc. Subsequently, a photo-resist pattern having a stepped difference is formed on the source/drain metal layer by a photolithography process using a second mask. In this case, a diffractive exposure mask having an exposure part at a channel part of the thin film transistor 206 is used as a second mask, thus the photo-resist pattern of the channel part has a lower height than other source/drain pattern. Subsequently, the source/drain metal layer is patterned by a wet etching process using the photo-resist pattern, thereby forming the source/drain metal pattern inclusive of the data line 204, the source electrode 210, the drain electrode 212 integrated with the source electrode 210, and a storage electrode 222. The n+ amorphous silicon layer and the amorphous silicon layer are simultaneously patterned by a dry etching process using the same photo-resist pattern, thereby forming the ohmic contact layer 250 and the active layer 248. The ohmic contact layer 250 and the source/drain metal pattern of the channel part are etched by the dry etching process after removing the photo-resist pattern, which has a relatively lower height in the channel part, by an ashing process. Accordingly, the active layer 248 of the channel part is exposed to separate the source electrode 210 and the drain electrode 212, and the photo-resist pattern remaining on the source/drain metal pattern is removed by a stripping process.

Figure 11C:
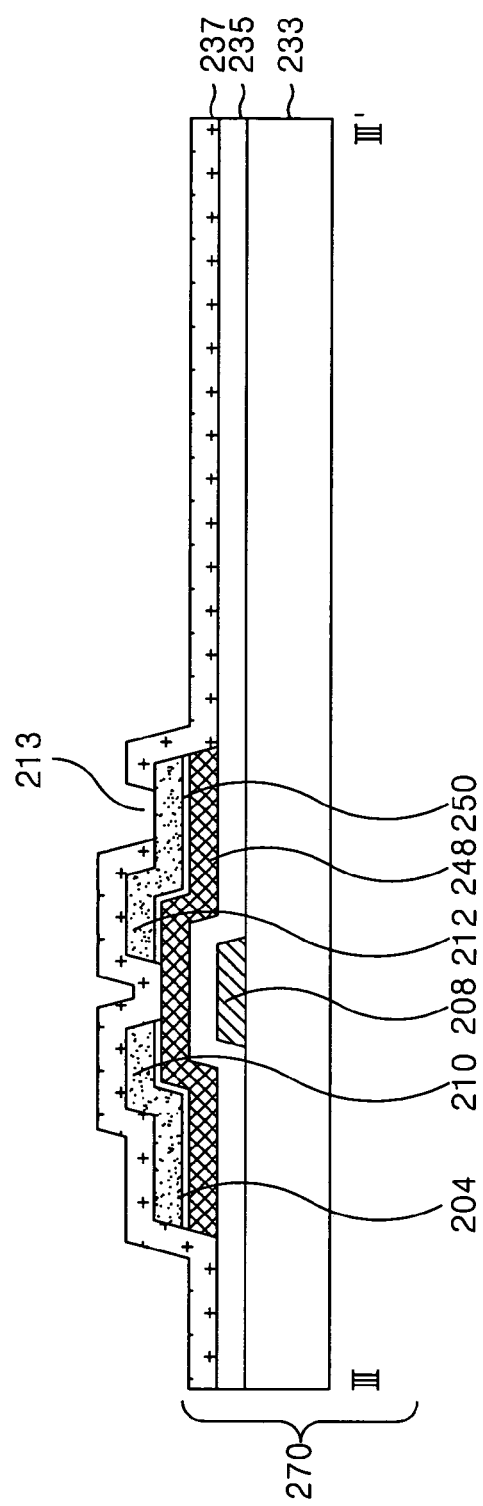

A passivation film 237 inclusive of the pixel contact hole 213 and the storage contact hole 221 is formed on the gate insulating film 235 where the source/drain metal pattern is formed by use of a third mask process, as shown in FIG. 11C.

To describe in detail, the passivation film 237 is formed on the entire surface of the gate insulating film 235 where the source/drain metal pattern is formed by a deposition method such as PECVD, etc. Subsequently, the passivation film 237 is patterned by the photolithography process using a third mask and the etching process, thereby forming a pixel contact hole 213 and a storage contact hole 221 (as shown in FIG. 8). The pixel contact hole 213 penetrates the passivation film 237 to expose the drain electrode 212, and the storage contact hole 221 penetrates the passivation film 237 to expose the storage electrode 222.

Herein, an inorganic insulating material such as the gate insulating film 235 or an organic insulating material such as BCB, PFCB or acrylic group organic compound, of which the dielectric constant is low, is used as a material of the passivation film 237.

Figure 11D:
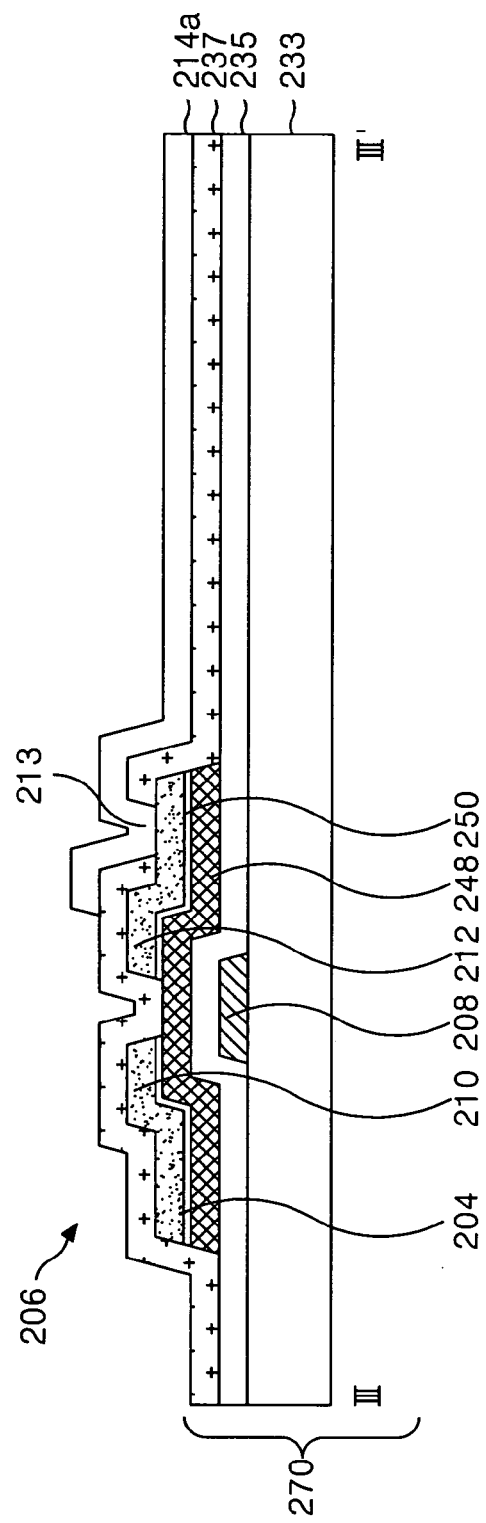

A transparent conductive pattern inclusive of the pixel electrode 214 is formed on the passivation film 237, as shown in FIG. 11D.

To describe in detail, the transparent conductive film is spread over the passivation film 237 by a deposition method such as sputtering, etc. Subsequently, the transparent conductive film is patterned by a photolithography process using a fourth mask and the etching process, thereby forming the transparent conductive pattern inclusive of the pixel electrode 214. The pixel electrode 214 is connected to the drain electrode 212 which is exposed through the pixel contact hole 213, and electrically connected to the storage electrode 222 through the storage contact hole 221.

Herein, one of ITO (indium tin oxide), TO (tin oxide), ITZO (indium tin zinc oxide), IZO (indium zinc oxide), etc is used as a material of the transparent conductive film.

Figure 11E:
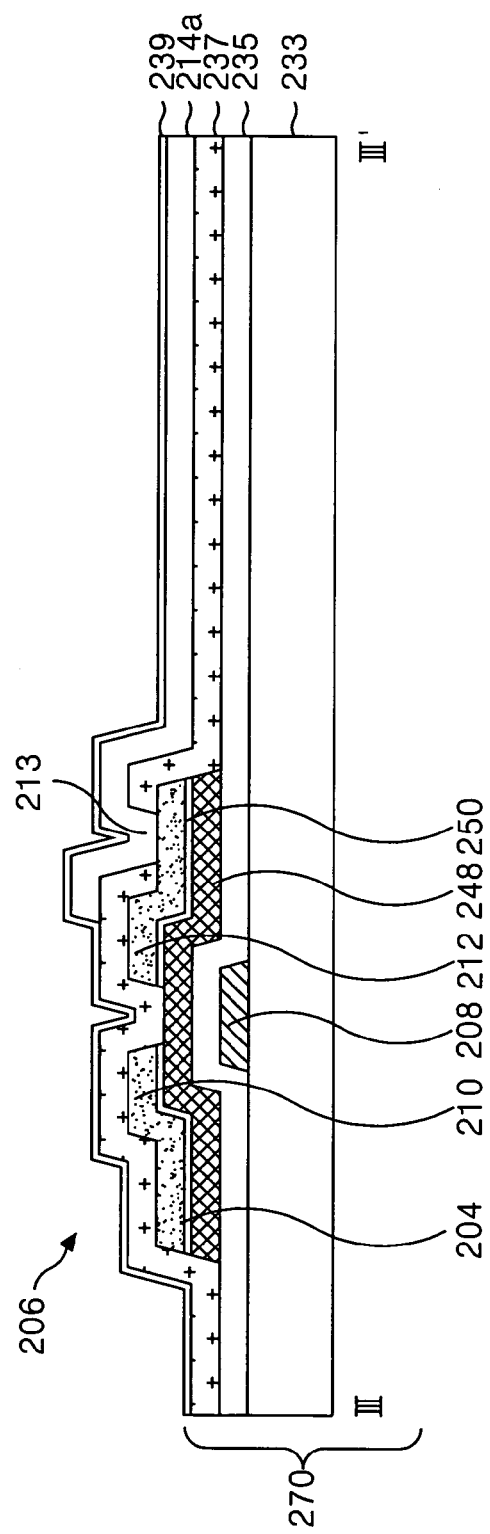

An alignment material such as polyimide PI, etc is spread over the lower substrate 233 where the pixel electrode 213 is formed and a rubbing process is carried out, thereby forming an alignment film 239, as in FIG. 11E.

The color filter substrate 280 and the thin film transistor substrate 270 which are formed through such processes are bonded together, and then, the upper and lower polarizers 231, 232 inclusive of the upper and lower compensation films 251, 253 are adhered, as shown in FIGS. 5A and 5B.

As described above, the liquid crystal display and the fabricating method includes the compensation layer, which acts as the compensation film, instead of an expensive compensation film, thereby making it possible to reduce the cost and to greatly reduce the light leakage phenomenon.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display device comprising:
a color filter substrate that includes a first polarizer, an optical compensation layer formed of a reactive mesogen, a first compensation film as an A-plate, a first substrate and a color filter array
wherein the color filter array includes a black matrix disposed on the first substrate to divide a cell area; a plurality of color filters disposed in the cell area that is divided by the black matrix; and a common electrode disposed on the color filter to form a vertical electric field together with the pixel electrode;
a thin film transistor substrate that includes a thin film transistor array, a second substrate, the thin film transistor array being disposed on the second substrate, a second polarizer disposed at a rear of the second substrate, and a second compensation film disposed between the second polarizer and the second substrate;
wherein the thin film transistor array includes a gate line disposed on the second substrate; a data line that crosses the gate line to be insulated therefrom, thereby determining a pixel area; a thin film transistor disposed at a crossing part of the gate line and the data line; and a pixel electrode that is connected to the thin film transistor and disposed in the pixel area;
wherein the optical compensation layer is disposed at a place between the color filter and the common electrode;
wherein the light axis of the first compensation film has the same horizontal axis as the light transmission axis of the first polarizer.

2. The liquid crystal display device according to claim 1, wherein the first and second polarizers have light transmission axes that cross each other.

3. A fabricating method of a liquid crystal display device comprising:
providing a first substrate and a second substrate with liquid crystal cells therebetween, wherein the first substrate and the second substrate face each other with the liquid crystal cells interposed therebetween;
forming a color filter substrate inclusive of a first polarizer, an optical compensation layer formed of a reactive mesogen, a first compensation film as an A-plate, and a color filter array on the first substrate; and
forming a thin film transistor substrate inclusive of a thin film transistor array on the second substrate, a second polarizer at a rear of the second substrate, and a second compensation film between the second polarizer and the second substrate;
wherein forming the color filter array includes the steps of: forming a black matrix that divides the pixel area on the first substrate; forming a plurality of color filters with the black matrix therebetween; and forming a common electrode on the color filter to form a vertical electric field together with the pixel electrode;
wherein forming the thin film transistor array includes the steps of: forming a gate line on the second substrate; forming a data line that crosses the gate line to be insulated therefrom, thereby determining a pixel area; forming a thin film transistor at a crossing part of the gate line and the data line; and forming a pixel electrode, which is connected to the thin film transistor, in the pixel area;
wherein the optical compensation layer is disposed at a place between the color filters and the common electrode;
wherein the light axis of the first compensation film has the same horizontal axis as the light transmission axis of the first polarizer.

4. The fabricating method according to claim 3, wherein the first and second polarizers are formed to have light transmission axes cross each other.

* * * * *